United States Patent
Yoshida et al.

(10) Patent No.: US 8,865,364 B2
(45) Date of Patent: Oct. 21, 2014

(54) SOLID OXIDE FUEL CELL

(75) Inventors: Toshihiro Yoshida, Nagoya (JP);
Takashi Ryu, Nagoya (JP); Taku Okamoto, Nagoya (JP); Masaru Nishitoba, Komaki (JP); Makoto Ohmori, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 89 days.

(21) Appl. No.: 13/284,082

(22) Filed: Oct. 28, 2011

(65) Prior Publication Data
US 2012/0107716 A1    May 3, 2012

Related U.S. Application Data

(60) Provisional application No. 61/509,244, filed on Jul. 19, 2011.

(30) Foreign Application Priority Data

Nov. 1, 2010  (JP) .................. 2010-245599
Jul. 14, 2011  (JP) .................. 2011-156138

(51) Int. Cl.
  *H01M 8/24*   (2006.01)
  *H01M 2/08*   (2006.01)
  *H01M 8/02*   (2006.01)
  *H01M 8/12*   (2006.01)

(52) U.S. Cl.
  CPC   *H01M 8/02* (2013.01); *H01M 8/12* (2013.01); *Y02E 60/525* (2013.01); *Y02E 60/50* (2013.01); *Y02E 60/521* (2013.01)
  USPC ............ 429/468; 429/467; 429/507; 429/509

(58) Field of Classification Search
  USPC .................................. 429/467–470
  See application file for complete search history.

(56) References Cited

U.S. PATENT DOCUMENTS

| 5,639,572 | A | * | 6/1997 | Mori et al. ............ 429/123 |
| 6,436,861 | B1 | * | 8/2002 | Suzuki et al. ............ 501/80 |
| 2003/0040420 | A1 | * | 2/2003 | Larsen et al. ............ 501/15 |
| 2008/0268323 | A1 | * | 10/2008 | Tucker et al. ............ 429/36 |
| 2011/0198216 | A1 | * | 8/2011 | Larsen et al. ............ 204/242 |
| 2011/0269047 | A1 | * | 11/2011 | Tucker et al. ............ 429/452 |

FOREIGN PATENT DOCUMENTS

| EP | 1 010 675 A1 | 6/2000 |
| EP | 1 211 230 A1 | 6/2002 |
| EP | 2 104 171 A1 | 9/2009 |
| JP | 03-133064 A1 | 6/1991 |
| JP | 07-130379 A1 | 5/1995 |
| JP | 07-135017 A1 | 5/1995 |
| JP | 09-097621 A1 | 4/1997 |

(Continued)

OTHER PUBLICATIONS

International Preliminary Report on Patentability dated Nov. 22, 2011.

*Primary Examiner* — Muhammad Siddiquee
(74) *Attorney, Agent, or Firm* — Burr & Brown, PLLC

(57) ABSTRACT

A solid oxide fuel cell includes two or more power generating elements each having a cathode, an anode, and an electrolyte layer placed between the cathode and the anode; an interconnector electrically connecting the power generating elements and containing a chromite-based material; and a sealing portion provided between the electrolyte layer and the interconnector and not containing either Ni or $ZrO_2$.

12 Claims, 12 Drawing Sheets

(56) References Cited

FOREIGN PATENT DOCUMENTS

| | | |
|---|---|---|
| JP | 2005-116289 A1 | 4/2005 |
| JP | 2008-522370 A1 | 6/2008 |
| JP | 2009-134930 | 6/2009 |
| WO | 2006/127045 A2 | 11/2006 |
| WO | 2008/127565 A2 | 10/2008 |
| WO | WO2010030300 * 3/2010 .............. H01M 8/02 |

* cited by examiner

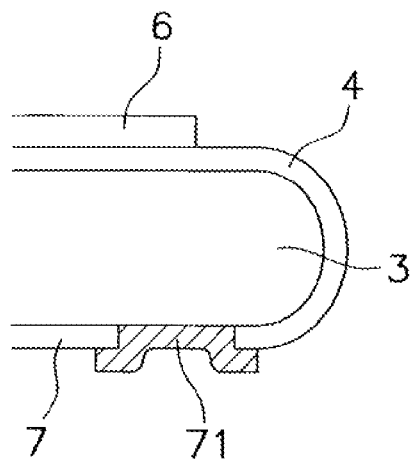 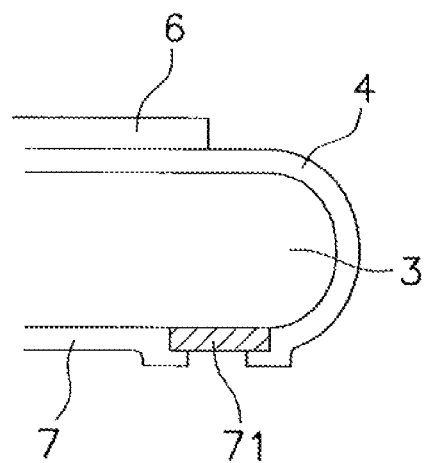
FIG. 9          FIG. 10
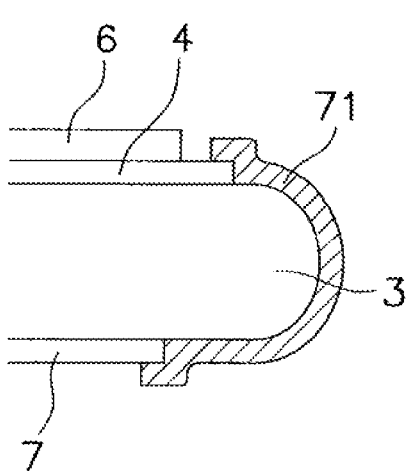 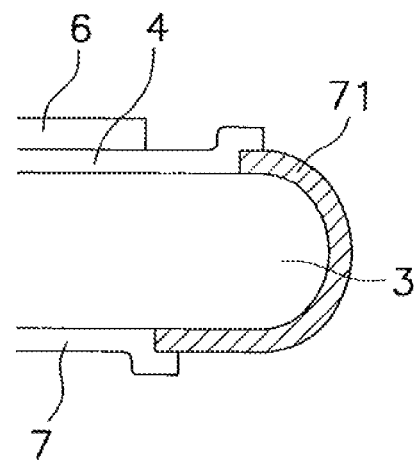
FIG. 11         FIG. 12

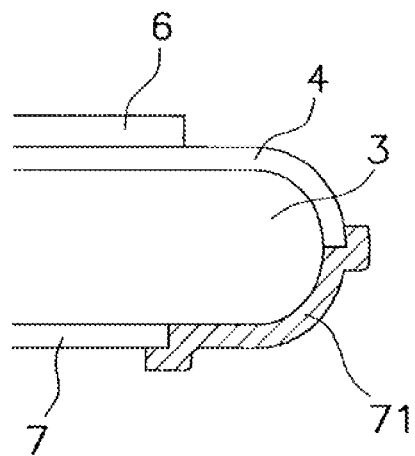 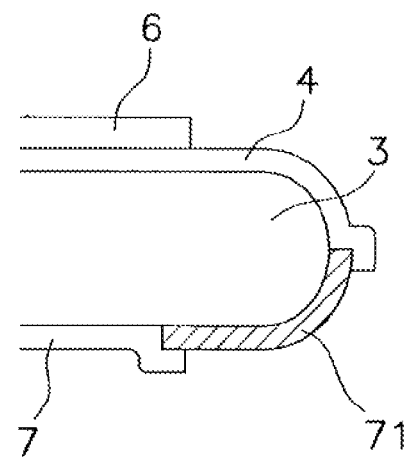
FIG. 13  FIG. 14
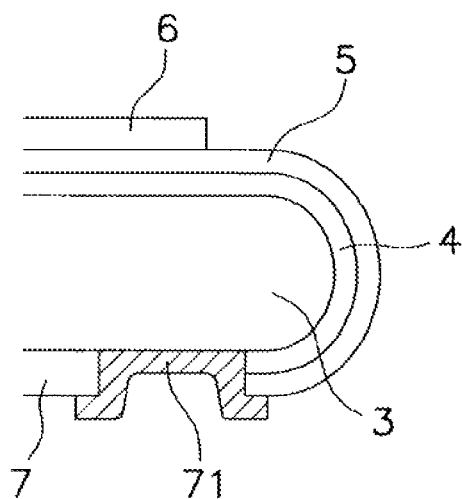 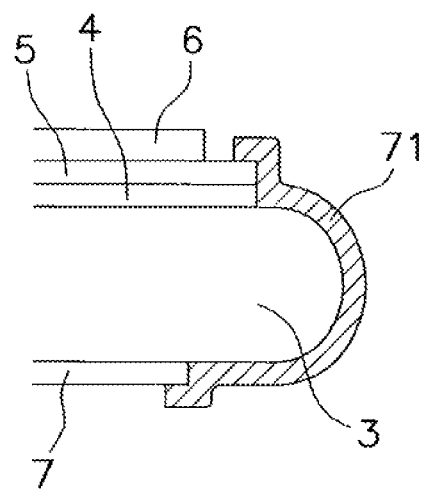
FIG. 15  FIG. 16

_US 8,865,364 B2_

SOLID OXIDE FUEL CELL

CROSS-REFERENCE TO RELATED APPLICATIONS

This application claims priority to Japanese Patent Application No. 2010-245599 filed on Nov. 1, 2010, Japanese Patent Application No. 2011-156138 filed on Jul. 14, 2011 and U.S. Provisional Application No. 61/509,244 filed on Jul. 19, 2011. The entire disclosure of Japanese Patent Application Nos. 2010-245599 and 2011-156138 and U.S. Provisional Application No. 61/509,244 are hereby incorporated herein by reference.

BACKGROUND OF THE INVENTION

1. Field of the Invention

The present invention relates to a solid oxide fuel cell.

2. Description of the Related Art

JP 2009-134930A discloses a segmented-in-series fuel cell. This fuel cell has an insulating substrate and a plurality of cells provided on the insulating substrate. The fuel cell has an anode (fuel electrode), an electrolyte layer made from yttria-stabilized zirconia (YSZ: $(Y_2O_3)_X(ZrO_2)_{1-X}$ (wherein x is 0.05 to 0.15)), and a cathode (air electrode) that are stacked in sequence. Adjacent cells are electrically connected to each other in series via a current collector and an interconnector made from lanthanum chromite. Moreover, the fuel cell has an interlayer that is provided between the interconnector and the electrolyte layer. Specifically, in Patent Document 1, an interlayer made from $Y_2O_3$ to which 1 wt % to 20 wt % of NiO is added and that is provided on lanthanum chromite ($La_{0.8}Sr_{0.2}CrO_3$) is described. JP 2009-134930A states that the interlayer can reduce a gas leak.

However, the present inventors have found that there are still some problems as follows with the conventional technique.

When the interlayer formed of NiO—$Y_2O_3$ is in contact with the lanthanum chromite interconnector, an agglomerated layer of Ni—O is formed at the interface between the interlayer and the interconnector. Ni—O is reduced to Ni at reduced atmosphere around 800 Celsius degree, and thus the volume of the Ni—O agglomerated layer is decreased. As a result, a crack in the agglomerated layer, delamination of the interlayer from the interconnector, and defects are likely to occur. Such defects result in a gas leak.

SUMMARY OF THE INVENTION

An object of the present invention is to reduce a gas leak in a fuel cell.

In a first aspect of the present invention, a solid oxide fuel cell comprises: two or more power generating elements each having a cathode, an anode, and an electrolyte layer placed between the cathode and the anode; an interconnector electrically connecting the power generating elements and containing a chromite-based material; and a sealing portion provided between the electrolyte layer and the interconnector and not containing either Ni or $ZrO_2$.

In the solid oxide fuel cell above, the sealing portion that does not contain either Ni or $ZrO_2$ is placed between the interconnector and the electrolyte layer, and thus a gas leak can be reduced.

BRIEF DESCRIPTION OF THE DRAWINGS

FIG. 9 is a cross-sectional view showing another configuration of the fuel cell.

FIG. 10 is a cross-sectional view showing another configuration of the fuel cell.

FIG. 11 is a cross-sectional view showing another configuration of the fuel cell.

FIG. 12 is a cross-sectional view showing another configuration of the fuel cell.

FIG. 13 is a cross-sectional view showing another configuration of the fuel cell.

FIG. 14 is a cross-sectional view showing another configuration of the fuel cell.

FIG. 15 is a cross-sectional view showing another configuration of the fuel cell.

FIG. 16 is a cross-sectional view showing another configuration of the fuel cell.

DETAILED DESCRIPTION OF THE INVENTION

The solid oxide fuel cell of the present invention includes two or more power generating elements each having a cathode, an anode, and an electrolyte layer placed between the cathode and the anode; an interconnector electrically connecting the power generating elements and containing a chromite-based material; and a sealing portion provided between the electrolyte layer and the interconnector and not containing either Ni or $ZrO_2$.

1. Example 1

Figure 1:
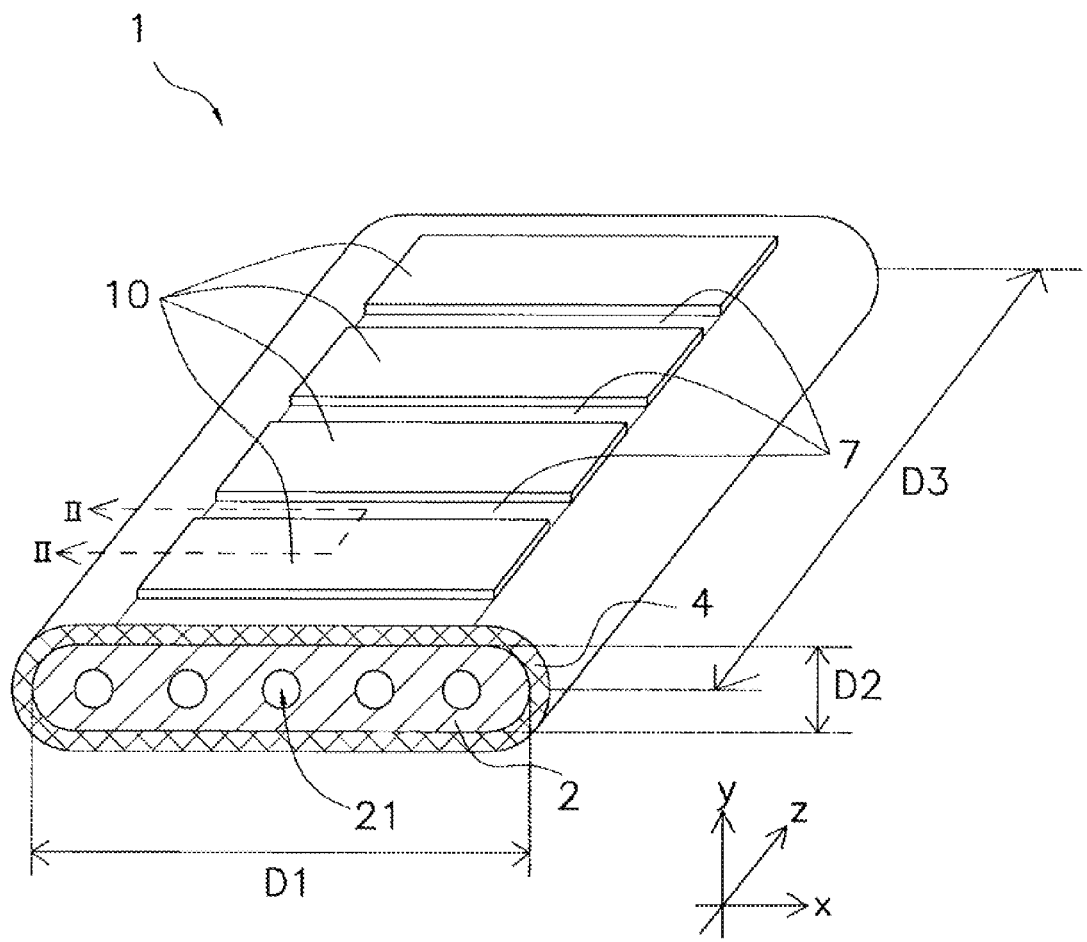
FIG. 1 is a perspective view showing one example of a segmented-in-series solid oxide fuel cell.
Figure 2:
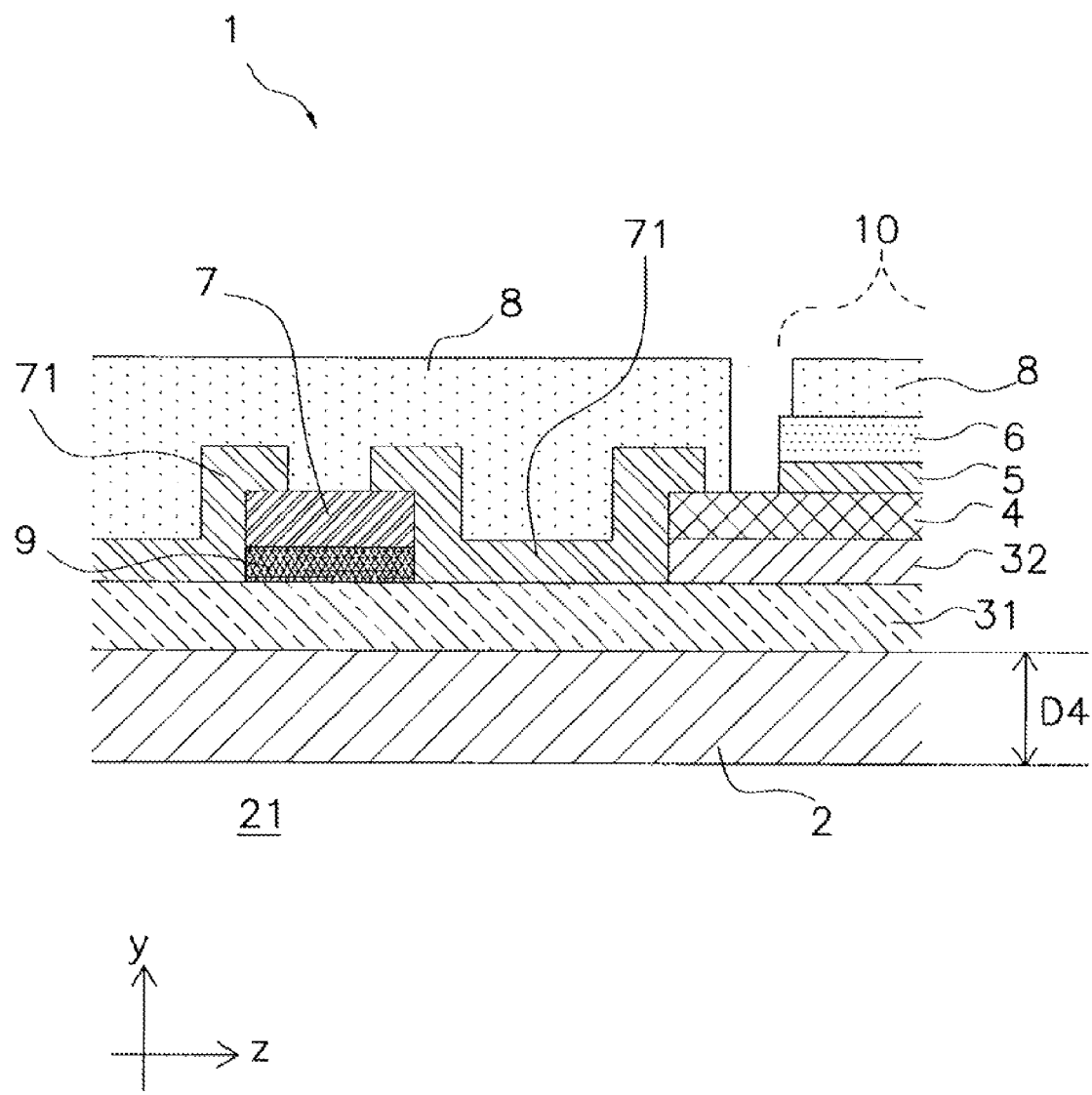
FIG. 2 is a longitudinal cross-sectional view taken along the arrow II-II of the segmented-in-series solid oxide fuel cell of FIG. 1.

As shown in FIGS. 1 and 2, the segmented-in-series solid oxide fuel cell (hereinafter simply referred to as a "fuel cell") 1 of this example includes a support substrate 2, an anode (including an anode current collecting layer 31 and an anode active layer 32), an electrolyte layer (solid electrolyte layer) 4, a barrier layer 5, a cathode 6, an interconnector 7, a sealing portion 71, and a current collector 8. In FIG. 1, the current collector 8 is not shown for convenience of description.

The fuel cell 1 has power generating elements 10. The power generating element 10 includes the anode (31, 32) and the cathode 6 that corresponds to the anode (31, 32). Specifically, the power generating element 10 includes the anode (31, 32), the electrolyte layer 4, the barrier layer 5, and the cathode 6 that are stacked in the thickness direction (y-axis direction) of the support substrate 2.

The support substrate 2 has a shape that is flat and elongated in one direction (z-axis direction). The support substrate 2 is a porous material and may contain nickel. More specifically, the support substrate 2 may contain Ni—$Y_2O_3$ (nickel-yttria) in major proportions. Nickel may be in an oxide form (NiO), but at the time of power generation, NiO may be reduced to Ni by hydrogen gas.

As used herein, the phrase "to contain a material in major proportions" may mean that the material is contained in a proportion of no less than 50 wt %, or the phrase may mean that the material is contained in a proportion of no less than 60 wt %, no less than 80 wt %, or no less than 90 wt %. The phrase "to contain a material in major proportions" could be a case where the whole consists of only one material.

As shown in FIGS. 1 and 2, a gas flow channel 21 is formed inside the support substrate 2. The gas flow channel 21 extends in the longitudinal direction (z-axis direction) of the support substrate 2. While electric power is generated, fuel gas is introduced into the gas flow channel 21, flows through pores of the support substrate 2, and is supplied to the anode current collecting layer 31 and the anode active layer 32, which will be described below.

In this example, the anode has the anode current collecting layer 31 and the anode active layer 32. The anode current collecting layer 31 is provided on the support substrate 2, and the anode active layer 32 is provided on the anode current collecting layer 31.

A plurality of anode current collecting layers 31 are placed in the longitudinal direction (z-axis direction) of the support substrate 2. There is a space between the anode current collecting layers 31 adjacent to each other in the longitudinal direction (z-axis direction) of the support substrate 2. Each anode current collecting layer 31 may contain nickel. The anode current collecting layer 31 may also contain yttrium and/or cerium. Specifically, the anode current collecting layer 31 may contain yttria and/or ceria, and for example, may contain Ni—$Y_2O_3$ or Ni-GDC (gadolinia-doped ceria) in major proportions. Nickel may be in an oxide form (NiO), but at the time of power generation, NiO may be reduced to Ni by hydrogen gas.

A plurality of anode active layers 32 are placed in the longitudinal direction (z-axis direction) of one support substrate 2. There is a space between the anode active layers 32 adjacent to each other in the longitudinal direction (z-axis direction) of the support substrate 2. One anode active layer 32 is placed on one anode current collecting layer 31.

The anode active layer 32 may contain nickel and zirconia. The zirconia may contain a rare earth element to form a solid solution. Specifically, the anode active layer 32 may contain the same zirconia-based material as contained in the electrolyte layer 4. In the anode active layer 32, nickel may be in an oxide form (NiO), but at the time of power generation, NiO may be reduced to Ni by hydrogen gas, as the same manner in the anode current collecting layer 31.

As shown in FIG. 2, the electrolyte layer 4 is provided so as to cover the anode active layer 32. The electrolyte layer 4 may be provided not only on the anode active layer 32 but also on the anode current collecting layer 31 or on the support substrate 2. The electrolyte layer 4 is dense, whereas the support substrate 2, the anode current collecting layer 31, and the anode active layer 32 are porous, and therefore the electrolyte layer 4 together with the dense interconnector 7 and the dense sealing portion 71 can separate air from fuel gas in the fuel cell 1. The electrolyte layer 4 may also be called as a solid electrolyte layer.

The electrolyte layer 4 may contain zirconia, and more specifically, the electrolyte layer 4 can contain zirconia in major proportions. For example, the electrolyte layer 4 may be a sintered body of a zirconia-based material such as yttria-stabilized zirconia, e.g., 3YSZ and 8YSZ; and scandia-stabilized zirconia (ScSZ).

The barrier layer 5 is provided on the electrolyte layer 4. As shown in FIG. 2, on the portion where no electrolyte layer 4 is provided, no barrier layer 5 needs to be provided. That is, one barrier layer 5 is provided so as to correspond to one anode active layer 32. Therefore, a plurality of electrolyte layers 4 are provided on one support substrate 2 in the longitudinal direction (z-axis direction) of the support substrate 2.

The barrier layer 5 may contain ceria (cerium oxide) in major proportions. Specific examples of the material of the barrier layer 5 include ceria and ceria-based materials which is ceria containing a rare earth metal oxide to be a solid solution. Specific examples of the ceria-based material include gadolinium-doped ceria (GDC: (Ce, Gd)$O_2$), samarium-doped ceria (SDC: (Ce, Sm)$O_2$), and the like.

The cathode 6 is provided on the barrier layer 5. The cathode 6 may be placed on the barrier layer 5 so as not to extend beyond the outer edge of the barrier layer 5 as shown in FIG. 2. That is, in FIG. 2, one cathode 6 is provided so as to correspond to one anode active layer 32. Therefore, a plurality of cathodes 6 are provided on one support substrate 2 in the longitudinal direction (z-axis direction) of the support substrate 2.

The cathode 6 may contain, for example, a lanthanum-containing perovskite complex oxide in major proportions. Specific examples of the lanthanum-containing perovskite complex oxide include lanthanum strontium cobalt ferrite (LSCF), lanthanum manganite, lanthanum cobaltite, and lanthanum ferrite. The lanthanum-containing perovskite complex oxide may be doped with Sr, Ca, Cr, Co, Fe, Ni, Al, or the like.

The interconnector 7 is formed on the anode current collecting layer 31. In FIG. 2, an interlayer 9, which will be described below, is placed between the anode current collecting layer 31 and the interconnector 7, but the present invention is not limited to this configuration, and the interconnector 7 may be directly provided on the anode current collecting layer 31. That is, the term "to be stacked" encompasses both the case where two members are arranged so as to be in contact and the case where two members are arranged so as to overlap in the y-axis direction without being in contact.

The interconnector 7 is placed between two power generating elements 10 in the longitudinal direction (z-axis direction) of the support substrate 2. By the interconnector 7 and the current collector 8, the adjacent power generating elements 10 in the longitudinal direction (z-axis direction) of the support substrate 2 are electrically connected.

The interconnector 7 is a layer denser than the support substrate 2, the anode current collecting layer 31, and the anode active layer 32. The interconnector 7 contains a chromite-based material. The chromite-based material may be represented by the following general formula (1).

$$Ln_{1-x}A_xCr_{1-y-z}B_yO_3 \quad (1)$$

In the formula (1), Ln is at least one element selected from the group consisting of Y and lanthanoids; the A site contains at least one element selected from the group consisting of Ca, Sr and Ba; the B site contains at least one element selected from the group consisting of Ti, V, Mn, Fe, Co, Cu, Ni, Zn, Mg and Al; and $0.025 \leq x \leq 0.3$, $0 \leq y \leq 0.22$, and $0 \leq z \leq 0.15$.

It is preferable that the interconnector 7 contains a chromite-based material in major proportions.

Moreover, the chromite-based material may have at least one of the conditions of $0.05 \leq x \leq 0.2$, $0.02 \leq y \leq 0.22$, and $0 \leq z \leq 0.05$.

The sealing portion 71 shown in FIG. 2 is one example of a sealing portion placed between the interconnector and the electrolyte layer. As shown in FIG. 2, the sealing portion 71 is placed between the interconnector 7 and the electrolyte layer 4 of the power generating element 10 placed adjacent to the interconnector 7. More specifically, the sealing portion 71 is placed so as to fill the space between the interconnector 7 and the electrolyte layer 4. The sealing portion 71 is placed so as to be in contact with the interconnector 7 and the electrolyte layer 4. A part of the upper surface of the interconnector 7 in FIG. 2 is not covered with the sealing portion 71. Components of one of the electrolyte layer 4, one of the sealing portion 71, the interconnector 7, another one of the sealing portion 71 and another one of the electrolyte layer 4 are placed in this order in the longitudinal direction (z-axis direction) of the support substrate 2, and the components adjacent to each other are in contact. Therefore, the fuel cell 1 may have a continuously sealing structure with the electrolyte layer 4, the sealing portion 71 and the interconnector 7 on the support substrate 2. Since the electrolyte layer 4, the sealing portion 71 and the interconnector 7 each have a dense structure, this sealing structure separates air from fuel gas.

The sealing portion 71 does not contain either Ni or $ZrO_2$. The sealing portion has a composition different from the composition of the electrolyte layer 4.

The phrase "does not contain" as used herein may permit a content of a specific component of less than 1 wt %.

With the Ni content being within the aforementioned range, a Ni rich layer which may be formed by Ni agglomeration between the sealing portion 71 and the interconnector 7 is not likely to be formed even when the sealing portion 71 and the interconnector 7 are co-fired. Therefore, delamination or the like is unlikely to occur between the interconnector 7 and the sealing portion 71 with a scaling portion 71 having such a configuration.

In the case where no sealing portion 71 is provided and a $ZrO_2$-containing electrolyte layer 4 is extended so as to be in contact with the interconnector 7, there is a problem in that the interconnector 7 containing a chromite-based material does not become dense even after sintering. On the other hand, this problem is not applicable in the case where the sealing portion 71, which does not contain $ZrO_2$, is provided, so that it is likely that the interconnector 7 has a dense structure.

Accordingly, providing the sealing portion 71 reduces a gas leak in the fuel cell 1.

The sealing portion 71 contains an oxide, and preferably contains an oxide in major proportions. Specifically, the sealing portion 71 may contain at least one oxide selected from the group consisting of $(AE)ZrO_3$, MgO, $MgAl_2O_4$, and $Ce_xLn_{1-x}O_2$. AE is an alkaline earth metal, Ln is at least one element selected from the group consisting of Y and lanthanoids, and x satisfies $0 < x \leq 0.3$. Examples of AE include Mg, Ca, Sr and Ba. The average particle size of the metal oxide is preferably 0.1 to 5.0 μm, and more preferably 0.3 to 4.0 μm.

It is preferable that the sealing portion 71 contains a oxide (that may be a mixture of two or more oxides) in major proportions. It is preferable that the sealing portion 71 contains $(AE)ZrO_3$ and MgO, and it is particularly preferable that the sealing portion 71 contains $(AE)ZrO_3$ and MgO in major proportions.

The $(AE)ZrO_3$ content of the sealing portion 71 may be 5 to 99 wt %, and the MgO content thereof may be 1 to 95 wt %. Within these ranges, the strength of the sealing portion 71 increases, so that durability can be further improved. More preferably, the $(AE)ZrO_3$ content may be 5 to 95 wt % and the MgO content may be 5 to 95 wt %, and even more preferably, the $(AE)ZrO_3$ content may be 10 to 90 wt % and the MgO content may be 10 to 90 wt %.

It is preferable that the ratio (weight ratio) of $(AE)ZrO_3$:MgO in the sealing portion 71 is 5:95 to 99:1. With such a ratio, the strength of the sealing portion 71 increases, so that durability can be further improved. More preferably, the ratio of $(AE)ZrO_3$:MgO is 5:95 to 95:5, and even more preferably, the ratio of $(AE)ZrO_3$:MgO is 10:90 to 90:10.

Preferably, AE is Ca. Specifically, it is preferable that the sealing portion 71 contains a $CaZrO_3$—MgO composite material in major proportions. In this case, $CaZrO_3$ and MgO may be merely mixed, or may be reacted or bonded to each other.

The average particle size of $CaZrO_3$ constituting the $CaZrO_3$—MgO composite is preferably 0.1 to 5.0 μm, and more preferably 0.3 to 3.0 μm. The particle size of MgO constituting the $CaZrO_3$—MgO composite is preferably 0.3 to 5.0 μm, and more preferably 0.4 to 4.0 μm. The particle size ratio of $CaZrO_3$:MgO is preferably 1:10 to 5:1. Use of the $CaZrO_3$—MgO composite having such particle sizes can further increase the density of the sealing portion, and can effectively inhibit delamination and/or a gas leak at interfaces of the components such as the sealing portion, the interconnector, the electrolyte in the case the components are co-fired.

The thickness of the sealing portion 71 is preferably 3 to 50 μm, and more preferably 5 to 20 μm.

As long as the sealing portion is provided between the electrolyte layer and the interconnector, the sealing portion may have a shape different from that of the sealing portion 71 of FIG. 2. It is preferable that the sealing portion is arranged so as to be in contact with the interconnector and the electrolyte layer. However, the sealing portion may be connected to the interconnector and the electrolyte layer via another layer.

Figure 3:
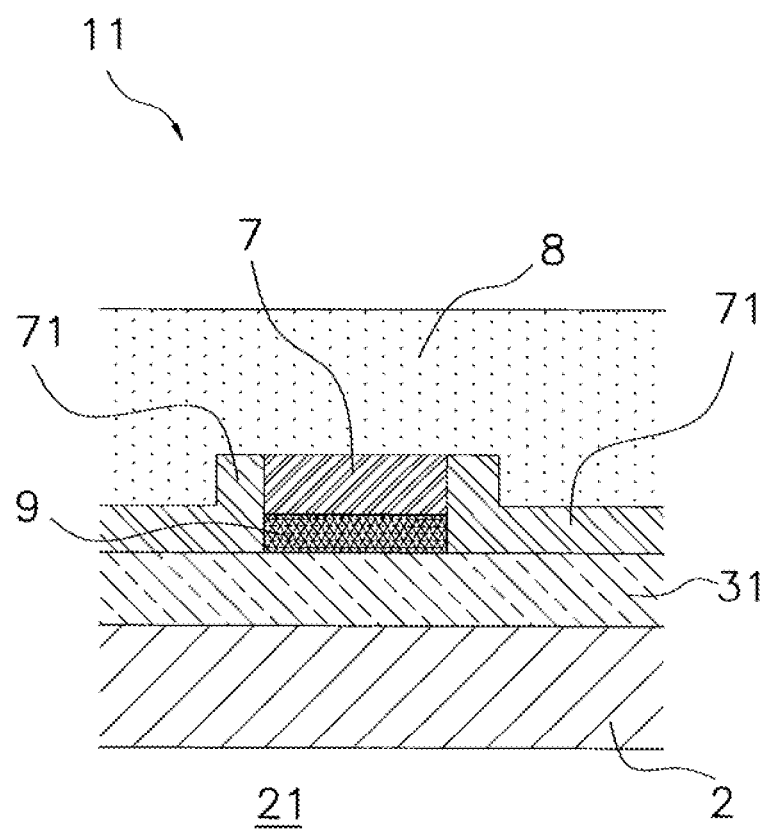
FIG. 3 is a cross-sectional view showing another configuration of the fuel cell.
Figure 3:
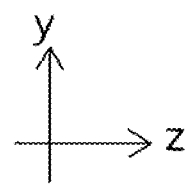
Figure 5:
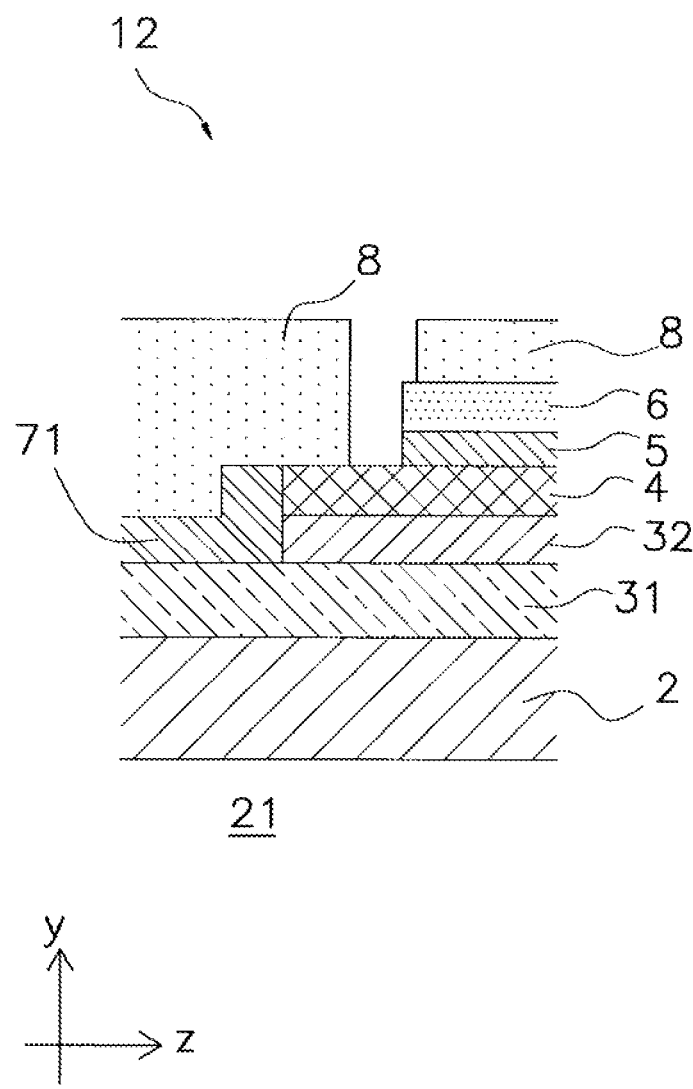
FIG. 5 is a cross-sectional view showing another configuration of the fuel cell.

In FIG. 2, the sealing portion 71 is provided such that a part of the upper surface of the interconnector 7 and a part of the upper surface of the electrolyte layer 4 are overlapped. That is, the sealing portion 71 is provided such that the edges of the sealing portion 71 are stacked on the interconnector 7 and electrolyte layer 4. The sealing portion 71 may be provided such that a part of the upper surface of the interconnector 7 and/or a part of the upper surface of the electrolyte layer 4 are in contact and not overlapped as shown in the fuel cell 11 in FIG. 3 or the fuel cell 12 in FIG. 5.

Figure 4:
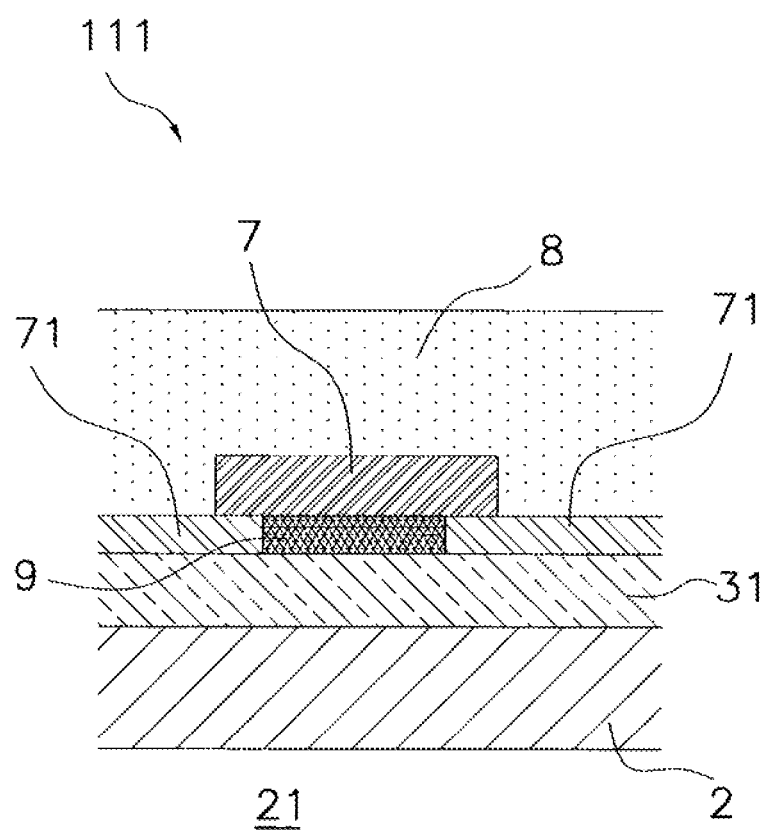
FIG. 4 is a cross-sectional view showing another configuration of the fuel cell.

As in the fuel cell 111 shown in FIG. 4, the sealing portion 71 may be provided such that a part of the interconnector 7 overlaps the sealing portion 71.

Figure 6:
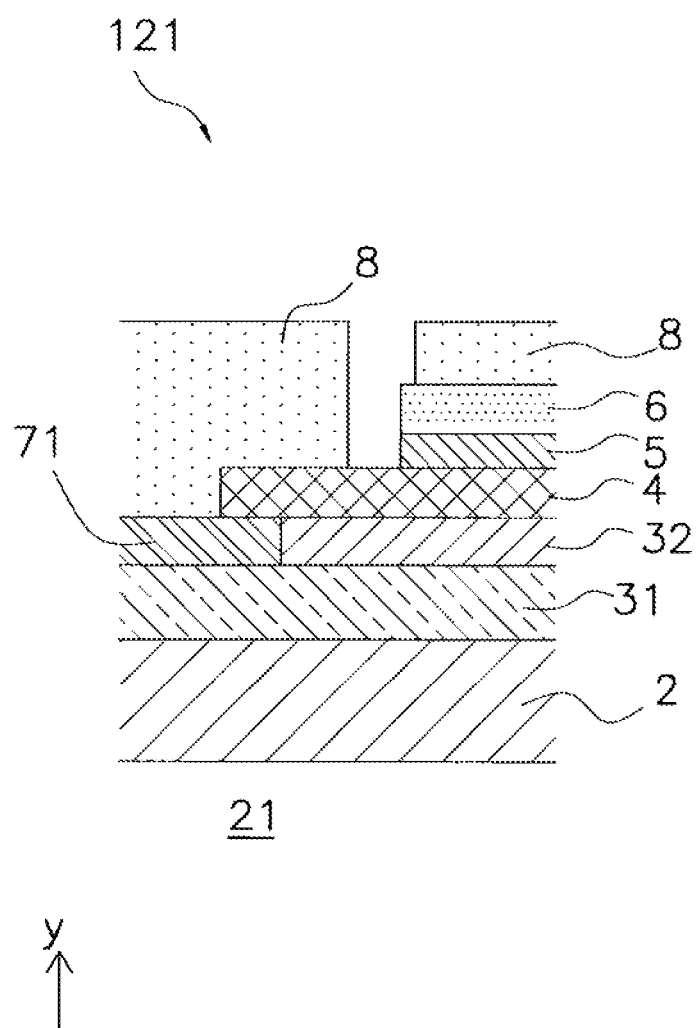
FIG. 6 is a cross-sectional view showing another configuration of the fuel cell.

Likewise, as in the fuel cell 121 shown in FIG. 6, the sealing portion 71 may be provided such that a part of the electrolyte layer 4 overlaps the sealing portion 71.

When the sealing portion 71 and the interconnector 7 are provided so as to overlap in some part in the y-axis direction, and/or when the sealing portion 71 and the electrolyte layer 4 are provided so as to overlap in some part in the y-axis direction, a gas leak may be effectively reduced. In any configuration, it is preferable that the sealing portion 71 is arranged so as to be in contact with the interconnector 7 and the electrolyte layer 4 as described above.

The amount of the area of the overlapping portion of the sealing portion 71 with the interconnector 7 or the electrolyte layer 4 in the y-axis direction, and the lengths in the z-axis direction and in the x-axis direction of this portion may be set according to the material of each member, the performance required of the fuel cell, and other factors, so as to effectively reduce a gas leak.

Figure 7:
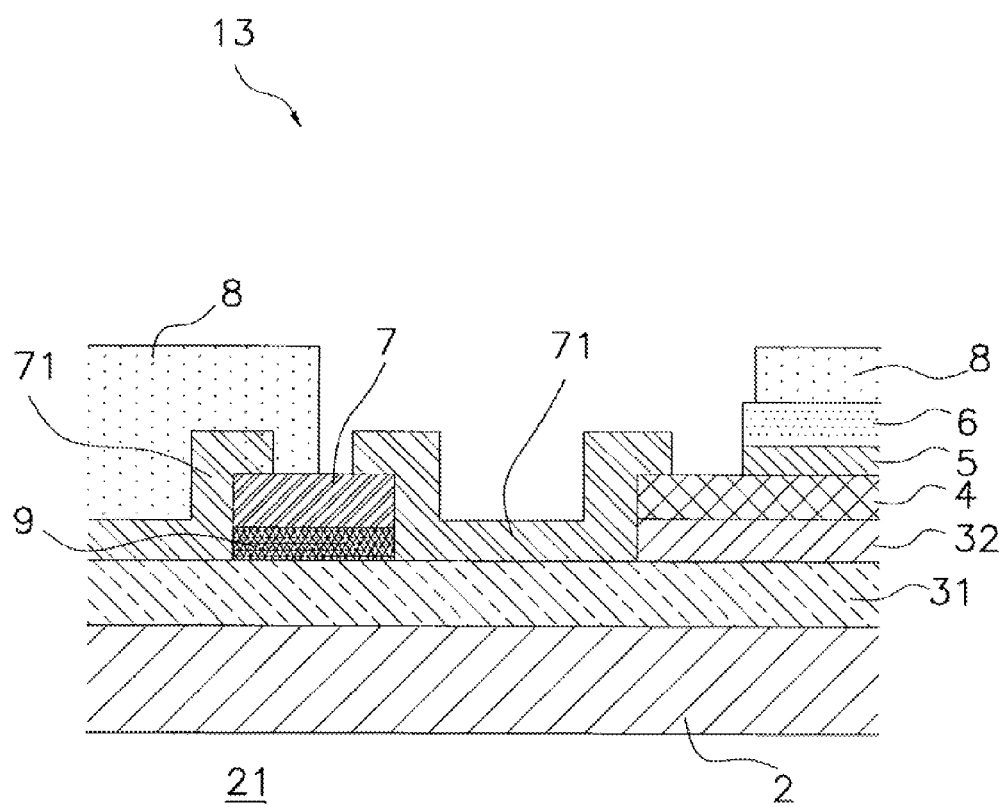
FIG. 7 is a cross-sectional view showing another configuration of the fuel cell.
Figure 8:
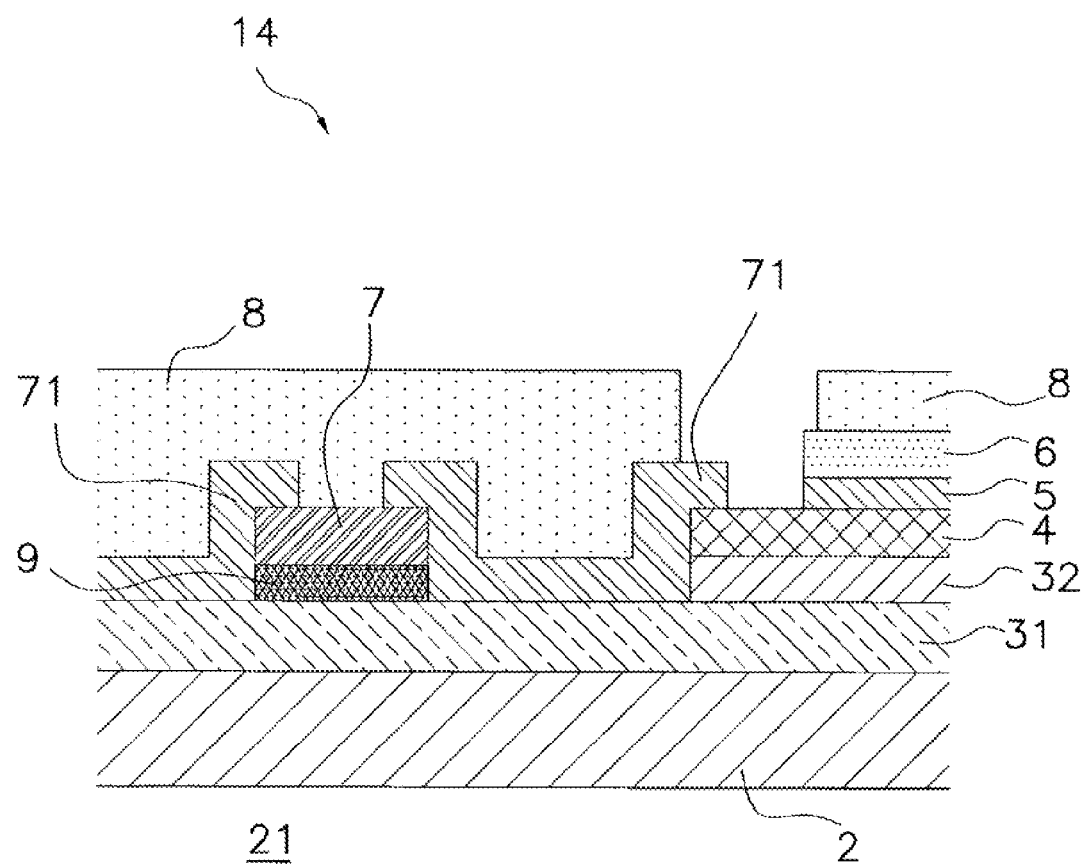
FIG. 8 is a cross-sectional view showing another configuration of the fuel cell.

The current collector 8 is placed so as to electrically connect the interconnector 7 and the adjacent power generating element 10. Specifically, the current collector 8 is continuously provided so as to be in contact with the cathode 6 which is included in one of the power generating element 10 and with the interconnector 7 which is included in another one of the power generating element 10 located adjacent to the one of the power generating element 10. In the configuration of FIG. 2, the current collector 8 covers the interconnector 7 and the sealing portion 71, and one edge of the current collector 8 is provided on the electrolyte layer 4. The configuration of the current collector 8 is not limited to that shown in FIG. 2. For example, as in the fuel cell 13 of FIG. 7, one edge of the current collector 8 may be provided on the interconnector 7, and as in the fuel cell 14 of FIG. 8, one edge of the current collector 8 may be provided on the sealing portion 71. As long as the current collector 8 is conductive, the current collector 8 may be composed of the similar material to that of the interconnector 7 or that of the cathode 6.

In FIGS. 3 to 8, the components shown in FIGS. 1 and 2 are either omitted or given the same numerical references, and no description thereof is provided.

The examples attained by combining the components having shapes shown in FIGS. 2 to 8 are also encompassed within the scope of the present invention.

The interlayer 9 may be placed between the anode current collecting layer 31 and the interconnector 7.

The interlayer 9 can contain a chromite-based material and the same element in the anode current collecting layer 31. The chromite-based material contained in the interlayer 9 does not need to be the same as that of the interconnector 7. For example, when the interconnector 7 and the interlayer 9 each contain chromite-based materials represented by the formula (1) and the element Ln for the interconnector 7 is La, the element Ln for the interlayer 9 may be an element other than La (for example, Y). Also, when the A site element in the interconnector 7 is Ca, the A site element a the interlayer 9 may be Sr.

The element Ln in the interconnector 7 and the element Ln in the interlayer 9 may be the same. Similarly, the element in the A site in the interconnector 7 and that in the interlayer 9 may be the same, and the element in the B site in the interconnector 7 and that in the interlayer 9 may be the same. The interlayer 9 may further contain another element in addition to the elements contained in the interconnector 7. The chromite-based material contained in the interlayer 9 may be the same as the chromite-based material contained in the interconnector 7.

The element contained in the interlayer 9 that is the same as the element contained in the anode current collecting layer 31 may be Ni.

In other words, the interlayer 9 may contain at least one of the elements constituting the anode current collecting layer 31 and at least one of the elements constituting the interconnector 7. For example, the interlayer 9 can contain Ln, Cr and Ni. The interlayer 9 may contain another element that is contained in the interconnector 7.

Specifically, the interlayer 9 can contain a chromite-based material and Ni in a volume ratio of about 70:30 to 30:70.

With the interlayer 9 having the foregoing composition, the agglomerated Ni layer is not likely to be formed between the interlayer 9 and the interconnector 7. Therefore, a crack in and delamination of the interlayer 9 are inhibited.

When the interlayer 9 contains a chromite-based material and Ni, the interlayer 9 may be functionally graded materials between the anode current collecting layer 31 containing Ni and the interconnector 7 containing a chromite-based material (this chromite-based material may be different from the chromite-based material contained in the interlayer 9), and thus the strength of joining between the interconnector 7 and the anode current collecting layer 31 can be enhanced.

In anode supported flat-tubular fuel cells, generally, the area where electric power generates and the area of the interconnector are nearly the same. On the other hand, in segmented-in-series fuel cells, generally, the area of the interconnector is smaller than the area of the power generating element. Therefore, in segmented-in-series fuel cells, the current density at the interconnector is much larger than that of the power generating element. Therefore, a drop in output power due to the increased resistance is significantly appears, which is hardly a problem in conventional anode supported flat-tubular fuel cells. Therefore, in segmented-in-series fuel cells, it is very important to decrease the electric resistance around the interconnector.

According to the configuration of this example, the agglomerated layer is not likely to be formed between the interlayer 9 and the interconnector 7 as described above. As a result, the electric resistance between the interconnector 7 and the anode current collecting layer 31 is decreased. Therefore, the technology of this example is particularly useful in segmented-in-series fuel cells.

In the interlayer 9, the volume ratio of 'the chromite-based material as the same as one contained in the interconnector 7' to 'Ni' may be, for example, 70:30 to 30:70.

The thickness of the interlayer 9 is not limited to a specific value, and may be, for example, 5 to 100 μm.

The power generating element 10 is electrically connected to the adjacent power generating elements 10 by the current collector 8 and the interconnector 7. Therefore, not only the interconnector 7 but also the current collector 8 contribute to the connection between the power generating elements 10, and such a configuration is also encompassed within the configuration in which an interconnector "electrically connects power generating elements".

Specifically, the size of the respective members of the fuel cell 1 can be set as follows.

Width D1 of support substrate 2: 1 to 10 cm
Thickness D2 of support substrate 2: 1 to 10 mm
Length D3 of support substrate 2: 5 to 50 cm
Distance D4 from external surface (interface between support substrate 2 and anode) to gas flow channel 21 of support substrate 2: 0.1 to 4 mm
Thickness of anode current collecting layer 31: 50 to 500 μm
Thickness of anode active layer 32: 5 to 30 μm
Thickness of electrolyte layer 4: 3 to 50 μm
Thickness of barrier layer 5: 3 to 50 μm
Thickness of cathode 6: 10 to 100 μm
Thickness of interconnector 7: 10 to 100 μm
Thickness of current collector 8: 50 to 500 μm The thickness of the sealing portion 71 is as described above. Needless to say, these values do not limit the present invention.

The solid oxide fuel cell of the present invention is a segmented-in-series solid oxide fuel cell containing a plurality of power generating elements formed on an insulating substrate, the power generating elements each having a cathode, an electrolyte layer and an anode, and connected via an electrically connecting portion including an interconnector. The interconnector is dense, connected to the anode, and containing a chromite-based material, the chromite represented by the following general formula (1):

$$Ln_{1-x}A_xCr_{1-y-z}B_yO_3 \tag{1}$$

In the formula (1), Ln is at least one element selected from the group consisting of Y and lanthanoids; the A site contains at least one element selected from the group consisting of Ca, Sr and Ba; the B site contains at least one element selected from the group consisting of Ti, V, Mn, Fe, Co, Cu, Ni, Zn, Mg and Al; and $0.025 \leq x \leq 0.3$, $0 \leq y \leq 0.22$, and $0 \leq z \leq 0.15$. The solid oxide fuel cell of the present invention contains a sealing portion containing $CaZrO_3$ and MgO provided between the electrolyte layer and the interconnector.

As long as the insulating substrate has insulation properties, the above-described support substrate 2 can be preferably used therefor.

The density of the interconnector can be observed, for example, with a leakage test on an insulating substrate provided with an interconnector on the one surface. In the leakage test, 0.2 atm of He gas is applied to the insulating substrate side. If no gas bubbles are observed on the interconnector surface, the interconnector is determined to be dense. Further, the density of the interconnector can be observed by an electron microscope. Specifically, the interconnector can be determined to be dense when a relative density of the interconnector material is no less than 90%, and preferably no less than 95% in an image analysis with the scanning electron micrograph.

In the solid oxide fuel cell of the present invention, the insulating substrate may be porous, and in addition, may have gas flow channels inside. An example of the gas flow channels is the gas flow channels 21 described above.

2. Other Examples

Example 1 is directed to a segmented-in-series fuel cell. In the fuel cell 1 of Example 1, two or more power generating elements 10 are provided on one support substrate 2, and the interconnector 7 is arranged so as to electrically connect the power generating elements 10 provided on the support substrate 2.

The present invention may be applied to an anode supported flat-tubular fuel cell. In such cell, a plurality of power generating elements, which are each provided with an anode layer, an electrolyte layer and a cathode layer to be a stack, are stacked in the thickness direction of the layers. In this case, the interconnector is arranged so as to electrically connect between the power generating elements that are adjacent in the thickness direction. In this case, in addition to the interconnector, the similar layer to the current collector 8 may be provided as necessary.

The anode supported flat-tubular and segmented-in-series configurations are both encompassed within the configuration in which an interconnector "electrically connects between power generating elements".

For example, as shown in FIGS. 9 and 10, the sealing portion 71 may be provided such that the side portion of the anode is surrounded by the electrolyte 4, and the electrolyte 4 is replaced by the sealing portion 71 on the flat portion.

Moreover, as shown in FIGS. 11 and 12, the sealing portion 71 may be provided such that the rounded surface of the side portion of the anode is entirely surrounded by the sealing portion 71.

Moreover, as shown in FIGS. 13 and 14, the sealing portion 71 may be provided such that the sealing portion 71 replaces on the rounded surface of the side of the anode.

Moreover, as shown in FIGS. 15 and 16, the sealing portion 71 may be provided such that the electrolyte 4 has the barrier layer 5 on the cathode 6 side.

In FIGS. 9 to 16, the components shown in FIGS. 1 and 2 are either omitted or given the same numerical references, and no description thereof is provided.

EXAMPLES

Preparation of Samples

Evaluation samples illustrated in FIG. 17 were prepared as described below.

Figure 17:
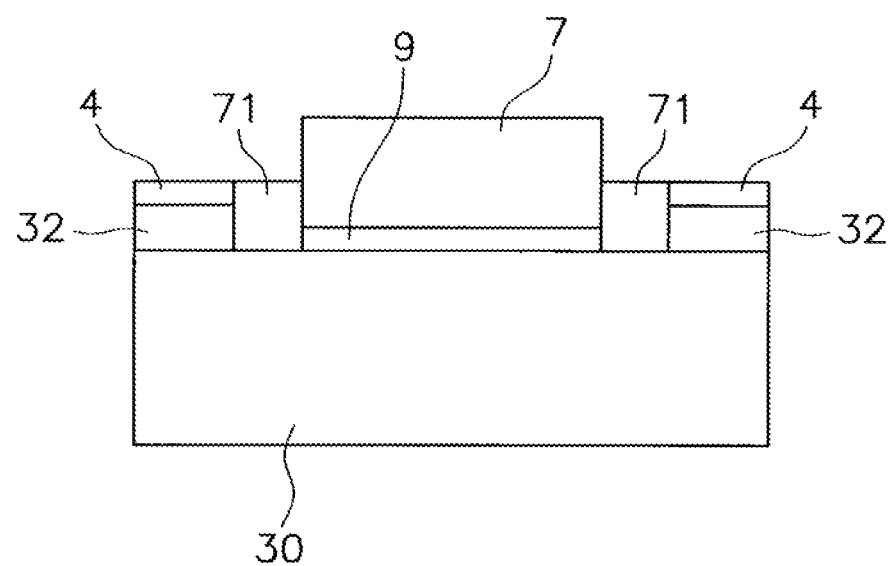
FIG. 17 is a cross-sectional view showing an evaluation sample for the Examples.

A porous substrate 30 as shown in FIG. 17 (corresponding to the above-described anode current collecting layer 31 and support substrate 2) was formed as follows. NiO powder and $Y_2O_3$ powder were mixed so that $Ni/Y_2O_3$ ratio is 40:60 vol % after reduction process. Cellulose powder in an amount of 20 wt % relative to the total weight of NiO powder and $Y_2O_3$ powder was added as a pore forming agent, and mixed. The mixture was granulated by an SD method (spray dry method). The resulting granules were subjected to uniaxial pressing at a pressure of 40 MPa, thus giving a green body in a pellet form (thickness of 2000 µm). The diameter of the pellets was 50 mm.

An interlayer 9 (thickness of 5 µm, diameter of 25 mm) was formed as follows. NiO powder and $(La, Ca)CrO_3$ powder (Ca content of 20 mol % in A site) were mixed in a ratio of $Ni:(La, Ca)CrO_3=1:1$ (volume ratio) after reduction process. To this mixed powder, ethylcellulose as a binder and terpineol as a solvent were added and mixed, thus giving a paste. This paste was screen-printed on the aforementioned green body. Note that it was also possible to fabricate the interlayer 9 by tape casting and thermocompression bonding.

An interconnector 7 (thickness of 30 µm, diameter of 25 mm) was formed as follows. To the same ingredient powder, i.e., $(La,Ca)CrO_3$ powder, as used in the interlayer 9, ethylcellulose as a binder and terpineol as a solvent were added and mixed, thus giving a paste. This paste was screen-printed on the aforementioned interlayer 9. Note that it was also possible to fabricate the interconnector 7 by tape casting and thermocompression bonding.

An NiO-8YSZ paste was printed onto the green body as an anode active layer 32 (thickness of 10 µm, outer diameter of 50 mm, inner diameter of 35 mm). The NiO-8YSZ paste was prepared with roller mill by mixing ethylcellulose (as a binder) and terpineol (as a solvent) NiO powder and 8YSZ. Volume ratio of Ni/8YSZ was 40:60 after reduction process. Moreover, an 8YSZ paste was printed onto the anode active layer 32 as an electrolyte layer 4 (thickness of 5 µm, outer diameter of 50 mm, inner diameter of 35 mm). The 8YSZ paste was prepared in the same manner as the NiO-8YSZ paste. Note that it was also possible to create the anode active layer 32 and the electrolyte layer 4 by tape casting and thermocompression bonding nearly in the same manner as that performed for the interlayer 9.

Moreover, as a sealing portion 71 (thickness of 15 µm), a sheet formed of one of the oxides shown in Tables 1 and 2 was arranged so as to cover a part of the electrolyte layer 4 and a part of the interconnector 7. Note that it was also possible to create the sealing portion 71 by tape forming nearly in the same manner as that performed for the interlayer 9.

The stacked sample was sintered at 1500° C. in air to co-fired the layers. After finishing sintering, the sample exposed to hydrogen gas at 800° C. in the furnaceto reduces NiO into Ni. Using the samples obtained in the above-described manner, the following evaluations were performed.

Leakage Test

Figure 18:
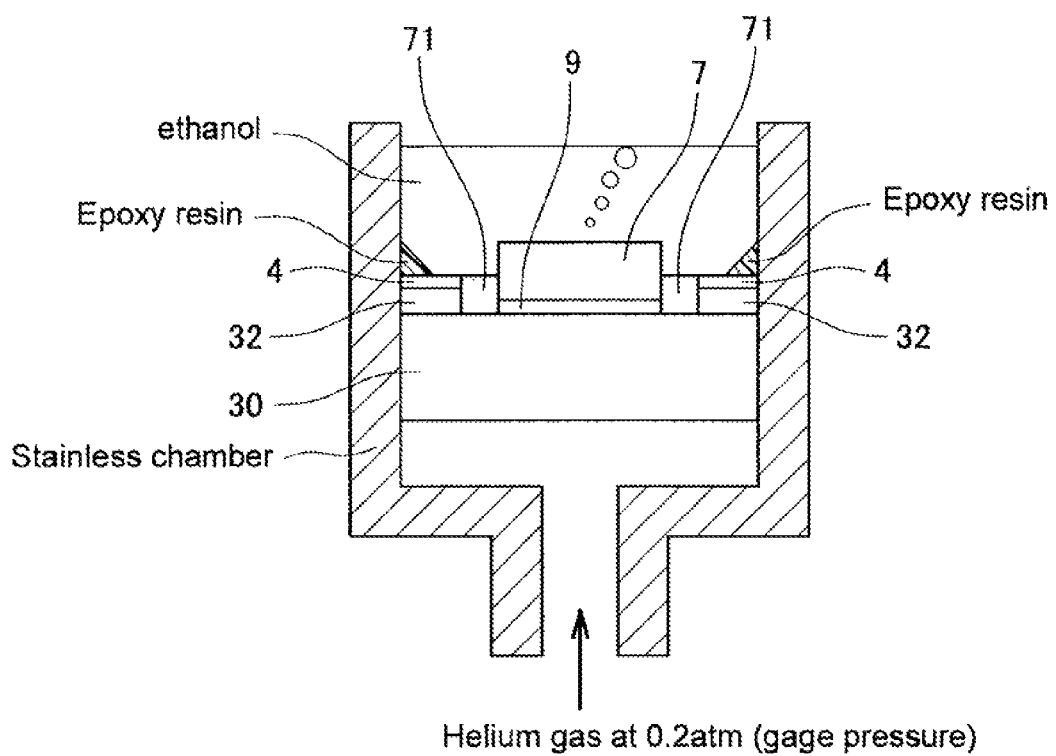
FIG. 18 is a cross-sectional view showing a leakage test device in a state of test.

The obtained sample was set in the stainless chamber as shown in FIG. 18. Helium gas was applied to the porous substrate side at a gage pressure of 0.2 atm, and the opposite surface (interconnector side) was soaked with ethanol. If gas leak occurs, a bubble comes out at the interconnector surface. Samples on which no gas bubbles were observed were evaluated as being "good", and samples on which gas bubbles were observed were evaluated as being "poor". The results are presented in the column "leakage test result" in Tables 1 and 2.

Observation of Cross-Section

The cross-section of the samples of Examples 1 to 12 and Comparative Examples 1 and 2 was observed under an scanning electron microscope.

Results

As shown in Tables 1 and 2, no gas leak occurred in the case where the scaling portion 71 was formed of the oxides ($CaZrO_3$, $SrZrO_3$, MgO, $MgAl_2O_4$, GDC, a mixture of $CaZrO_3$ and MgO ($CaZrO_3$—MgO composite), and MgO) of Examples 1 to 12.

In Examples 1 and 5, the interconnector formed of lanthanum chromite (LCC) was dense, and the joint between the interconnector and the sealing portion (CZO) was also tight. Likewise, in Examples 2 to 4 and 6 to 11, the dense interconnector and tight joint were obtained. In Example 12, although the result of the leakage test was slightly inferior to those of Examples 1 to 11, sufficient effects were obtained.

In contrast, in Comparative Examples 1 and 2 in which the sealing portion 71 was formed of Ni—$Y_2O_3$ and YSZ, respectively, a gas leak was observed.

In Comparative Example 1, NiO agglomerated layer was formed between the interconnector formed of lanthanum chromite (LCC) and the sealing portion formed of Ni—$Y_2O_3$ (Ni/$Y_2O_3$).

Observation of the sample of Comparative Example 2 revealed that the interconnector after sintering was not dense.

Thermal Cycle Test

The samples of Examples 5 to 11 were subjected to a reduction treatment (in an $H_2$ gas atmosphere, 800° C. and 5 hours), and then, a thermal cycle test was performed in a 4% $H_2$/Ar gas atmosphere at room temperature to 800° C. at a rate of temperature increase/decrease of 200° C./hr. The thermal cycle test was performed a total of 10 times, and then a leakage test was performed in the above-described manner.

The results are presented in the column titled "result of leakage test after thermal cycle test" in Table 2.

TABLE 1

|  | Oxide | Leakage test result |
| --- | --- | --- |
| Ex. 1 | $CaZrO_3$ | Good |
| Ex. 2 | $SrZrO_3$ | Good |
| Ex. 3 | MgO + $MgAl_2O_4$ (wt ratio of 1:1) | Good |
| Ex. 4 | Gd-doped $CeO_2$ | Good |
| Comp. Ex. 1 | Ni—$Y_2O_3$ | Poor |
| Comp. Ex. 2 | Y-doped $ZrO_2$ | Poor |

TABLE 2

|  | Composition of sealing film | Leakage test result | Result of leakage test after thermal cycle test |
| --- | --- | --- | --- |
| Ex. 5 | $CaZrO_3$ | Good | Poor |
| Ex. 6 | $CaZrO_3$ + MgO (90 wt %:10 wt %) | Good | Good |
| Ex. 7 | $CaZrO_3$ + MgO (80 wt %:20 wt %) | Good | Good |
| Ex. 8 | $CaZrO_3$ + MgO (60 wt %:40 wt %) | Good | Good |
| Ex. 9 | $CaZrO_3$ + MgO (40 wt %:60 wt %) | Good | Good |
| Ex. 10 | $CaZrO_3$ + MgO (20 wt %:80 wt %) | Good | Good |
| Ex. 11 | $CaZrO_3$ + MgO (10 wt %:90 wt %) | Good | Poor |
| Ex. 12 | MgO | Slightly good | — |

The materials of the sealing films used in the Examples and Comparative Examples above are as follows.

$CaZrO_3$: Commercially available reagent-grade calcium carbonate (manufactured by Wako Pure Chemical Industries, Ltd.) and zirconium oxide (manufactured by Wako Pure Chemical Industries, Ltd.) were weighed so as to attain a specific molar ratio, mixed in a pot mill, and sintered at 1400° C. for 5 hours, giving a $CaZrO_3$ in a single phase. XRD analysis revealed that above-described $CaZrO_3$ showed no second phase. Thereafter, the particle size was adjusted to D50=0.8 μm by wet grinding using a pot mill.

$SrZrO_3$: Commercially available reagent-grade strontium carbonate (manufactured by Wako Pure Chemical Industries, Ltd.) and zirconium oxide (manufactured by Wako Pure Chemical Industries, Ltd.) were weighed so as to attain a specific molar ratio, mixed in a pot mill, and sintered at 1400° C. for 5 hours, giving a $SrZrO_3$ in a single phase. XRD analysis revealed that above-described $CaZrO_3$ showed no second phase. Thereafter, the particle size was adjusted to D50=0.9 μm by wet grinding using a pot mill.

MgO: Source MgO having a purity of no less than 99% and manufactured by Wako Pure Chemical Industries, Ltd. was used. The particle size was adjusted to D50=1.0 μm by wet grinding using a pot mill.

$MgAl_2O_4$: Commercially available reagent-grade magnesium carbonate (manufactured by Wako Pure Chemical Industries, Ltd.) and aluminium hydroxide (manufactured by Wako Pure Chemical Industries, Ltd.) were weighed so as to attain a specific molar ratio, mixed in a pot mill, and sintered at 1400° C. for 10 hours, giving an $MgAl_2O_4$ in a single phase. XRD analysis revealed that above-described $MgAl_2O_4$ showed no second phase. Thereafter, the particle size was adjusted to D50=1.2 μm by wet grinding using a pot mill.

Gd-doped $CeO_2$: Commercially available reagent-grade gadolinium oxide (manufactured by Wako Pure Chemical Industries, Ltd.) and cerium oxide (manufactured by Wako Pure Chemical Industries, Ltd.) were weighed so as to attain a specific molar ratio, mixed in a pot mill, and sintered at 1400° C. for 10 hours, giving a (Gd, Ce)$O_2$ in a single phase. XRD analysis revealed that above-described (Gd, Ce)$O_2$ showed no second phase. Thereafter, the particle size was adjusted to D50=0.85 μm by wet grinding using a pot mill.

The thermal cycle test was much severer test than the leakage test of Table 1. Significant durability improvement was demonstrated with a CZO—MgO sealing film compared with the sealing film of Example 5. This appears to be due to the improved sealing film strength brought about by the MgO addition, in addition to the matched coefficient of thermal expansion.

Regarding the each Example, samples in which the side portion is surrounded by the electrolyte 4, and the electrolyte 4 is replaced by the sealing portion 71 on the flat portion. (see FIGS. 9 and 10); samples in which the rounded surface of the side portion is entirely surrounded by the sealing portion 71 (see FIGS. 11 and 12); samples in which the sealing portion 71 replaces on the rounded surface of the side of the anode (see FIGS. 13 and 14); and samples in which the electrolyte 4 has a barrier layer on the cathode 6 side (see FIGS. 15 and 16) were prepared according to the production method of the sample shown in FIG. 17. The obtained samples were evaluated in the same manner as above. As a result, the same results as those of the sample shown in FIG. 17 were obtained.

DESCRIPTION OF REFERENCE NUMERALS 1, 11-14, 111, 121, Segmented-in-series solid oxide fuel cell (solid oxide fuel cell)

2 Support substrate
3 Anode
31 Anode current collecting layer
32 Anode active layer
4 Electrolyte layer
5 Barrier layer
6 Cathode
7 Interconnector
71 Sealing portion
8 Current collector
9 Interlayer
10 Power generating element
21 Gas flow channel
30 Porous substrate (corresponding to anode current collecting layer 31 and support substrate 2)

What is claimed is:

1. A solid oxide fuel cell comprising:
two or more power generating elements each having a cathode, an anode, and an electrolyte layer placed between the cathode and the anode;
an interconnector electrically connecting the power generating elements and containing a chromite-based material; and
a sealing portion provided between the electrolyte layer and the interconnector and not containing either Ni or $ZrO_2$,
wherein the sealing portion contains at least 50 wt % of at least one oxide selected from the group consisting of $(AE)ZrO_3$, MgO, $MgAl_2O_4$ and $Ce_xLn_{1-x}O_2$, where AE is an alkaline earth metal, Ln is at least one element selected from the group consisting of Y and lanthanoids, and x satisfies $0<x\leq0.3$, and
wherein the sealing portion is positioned on both sides of the interconnector.

2. The solid oxide fuel cell of claim 1, wherein the sealing portion is provided so as to be in contact with the interconnector.

3. The solid oxide fuel cell of claim 1, wherein the sealing portion contains $(AE)ZrO_3$ and MgO.

4. The solid oxide fuel cell of claim 3, wherein the sealing portion has 5 to 99 wt % of $(AE)ZrO_3$ and 1 to 95 wt % of MgO.

5. The solid oxide fuel cell of claim 3, wherein the weight ratio of $(AE)ZrO_3$:MgO is 5:95 to 99:1.

6. The solid oxide fuel cell of claim 1, wherein AE is at least one element selected from the group consisting of Mg, Ca, Sr and Ba.

7. The solid oxide fuel cell of claim 1, wherein
the chromite-based material is represented by the following general formula (1):

$$Ln_{1-x}A_xCr_{1-y-z}B_yO_3 \quad (1)$$

wherein Ln is at least one element selected from the group consisting of Y and lanthanoids; the A site contains at least one element selected from the group consisting of Ca, Sr and Ba; the B site contains at least one element selected from the group consisting of Ti, V, Mn, Fe, Co, Cu, Ni, Zn, Mg and Al; and $0.025\leq x\leq 0.3$, $0\leq y\leq 0.22$, and $0\leq z\leq 0.15$.

8. The solid oxide fuel cell of claim 1, further comprising a substrate, wherein
the power generating elements are provided on the substrate, and
the interconnector is arranged so as to electrically connect the power generating elements provided on the substrate.

9. A segmented-in-series solid oxide fuel cell comprising a plurality of power generating elements formed on an insulating substrate, the power generating elements each having a cathode, an electrolyte layer and an anode, and connected via an electrically connecting portion including an interconnector, wherein
the interconnector is dense, connected to the anode, and containing a chromite-based material, the chromite represented by the following general formula (1):

$$Ln_{1-x}A_xCr_{1-y-z}B_yO_3 \quad (1)$$

wherein Ln is at least one element selected from the group consisting of Y and lanthanoids; the A site contains at least one element selected from the group consisting of Ca, Sr and Ba; the B site contains at least one element selected from the group consisting of Ti, V, Mn, Fe, Co, Cu, Ni, Zn, Mg and Al; and $0.025\leq x\leq 0.3$, $0\leq y\leq 0.22$, and $0\leq z\leq 0.15$,
wherein a sealing portion containing at least 50 wt % of $CaZrO_3$ and MgO is provided between the electrolyte layer and the interconnector, and
wherein the sealing portion is positioned on both sides of the interconnector.

10. The solid oxide fuel cell of claim 9, wherein the insulating substrate is porous and has gas flow channels inside.

11. The solid oxide fuel cell of claim 1, wherein each power generating element comprises an anode current collecting layer positioned below and in contact with the anode.

12. The solid oxide fuel cell of claim 1, wherein the entirety of the interconnector is spaced from the electrolyte layer.

* * * * *